(12) United States Patent
Wicks et al.

(10) Patent No.: US 8,264,697 B2
(45) Date of Patent: Sep. 11, 2012

(54) OBJECT DETECTION DEVICE

(75) Inventors: Matthew R. Wicks, O'Fallon, MO (US);
Christopher S. Maue, St. Louis, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 12/217,926

(22) Filed: Jul. 10, 2008

(65) Prior Publication Data

US 2009/0138121 A1 May 28, 2009

Related U.S. Application Data

(60) Provisional application No. 60/004,454, filed on Nov. 27, 2007.

(51) Int. Cl.
*G01B 11/03* (2006.01)
*G01B 11/06* (2006.01)
*G06F 7/00* (2006.01)

(52) U.S. Cl. .................. 356/614; 356/625; 700/219

(58) Field of Classification Search .......... 356/600–603, 356/607–608, 614–625; 250/559.29, 559.22; 345/419, 426, 427, 629, 581; 382/141, 154, 382/294; 702/155, 152, 153
See application file for complete search history.

(56) References Cited

U.S. PATENT DOCUMENTS

| | | | | |
|---|---|---|---|---|
| 4,299,491 A * | 11/1981 | Waters et al. | ................. | 356/602 |
| 4,707,647 A * | 11/1987 | Coldren et al. | ............... | 382/151 |
| 4,786,229 A * | 11/1988 | Henderson | .................... | 414/801 |
| 4,838,696 A * | 6/1989 | Pryor | ............................ | 356/602 |
| 5,291,270 A * | 3/1994 | Koch et al. | .................... | 356/602 |
| 5,946,645 A * | 8/1999 | Rioux et al. | .................. | 702/155 |
| 6,064,759 A * | 5/2000 | Buckley et al. | ............... | 382/154 |
| 6,102,291 A * | 8/2000 | Mazzone | ................. | 235/462.01 |
| 6,549,293 B2* | 4/2003 | Hofman | ........................ | 356/635 |
| 6,760,116 B2* | 7/2004 | Iwasaki | ......................... | 356/601 |
| 6,819,407 B2* | 11/2004 | Arita et al. | .................... | 356/4.01 |
| 6,822,748 B2* | 11/2004 | Johnston et al. | .............. | 356/608 |
| 6,974,964 B1* | 12/2005 | Wang | ......................... | 250/559.29 |
| 7,097,045 B2* | 8/2006 | Winkler | ........................ | 209/630 |
| 7,286,246 B2* | 10/2007 | Yoshida | ......................... | 356/605 |
| 2007/0121122 A1* | 5/2007 | Kaltenbach | ................... | 356/625 |
| 2007/0280812 A1* | 12/2007 | Morency et al. | .............. | 414/729 |

* cited by examiner

*Primary Examiner* — Sang Nguyen
(74) *Attorney, Agent, or Firm* — Frost Brown Todd LLC (57) ABSTRACT

An object detecting device for detecting the existence and general placement of an object residing upon a surface. A preferred embodiment of the invention uses a laser measuring scanner operated positioned by a servo motor to allow the laser measuring scanner to generate signals related to the placement of an object on a surface. Those placement signals are then processed by a computer to make a two or three dimensional determination of the object in coordinates that show the object's location in relation to another device such as a robotic depalletizer that can then be moved into position near the object to allow removal of the object by the robotic depalletizer.

32 Claims, 11 Drawing Sheets

Fig. 11
(Page 1 of 2)

Fig. 11
(Page 2 of 2)

OBJECT DETECTION DEVICE

CROSS REFERENCE TO RELATED APPLICATIONS

This application claims the benefit of priority of Provisional Application Ser. No. 61/004,454 filed on Nov. 27, 2007, and that application is incorporated by reference herein in its entirety for all purposes.

STATEMENT REGARDING FEDERALLY SPONSORED RESEARCH

Not Applicable.

BACKGROUND OF THE INVENTION

This invention relates to an apparatus and method for detecting an object, and more specifically to detection of an object or series of objects that are residing upon a pallet.

Certain types of business applications use various versions of machine vision to assist in the processes of design, manufacture, and shipping of many types of products. Use of such machine vision devices are helpful in making all of those processes more efficient and accurate.

In recent years, automated devices have been found to be very effective in the shipping of products, and in the palletizing and depalletizing of various products during shipping. Utilization of various types of automated devices can result in very fast removal of objects from a pallet or in very fast stacking of objects onto a pallet for shipping. However, the efficiency of such automated devices can depend directly upon the proper execution of each step in the shipping process. For example, before a pallet of products can be shipped, the pallet should be checked to ensure that the pallet is full and that the objects placed upon the pallet have been properly placed. In like manner, a depalletizer that removes objects from a pallet needs an accurate location definition of the objects in order to position the picking end effecter of a robot for a successful pick and removing an object from a pallet. Thus, incorrect placement of objects on a pallet that has been loaded by automatic loading devices can result in damage to products, ineffective shipping, and reduced accuracy in the products being shipped, while incorrectly identifying the placement of objects on a surface can result in failure to remove objects from a pallet and in damage of the objects.

Prior art machine vision devices require consistent ambient lighting and in many cases it requires extra flood lighting in order to detect the variations between light and dark reflections. The rendered image from machine vision is also two dimensional and requires intense computation to figure out even low tolerance dimensions and locations. As a result, machine vision works best when interacting in real time with movements of the palletizer/depalletizer picking arm. This real time interaction usually requires the vision lens to be located near or even on the end effecter. The added task of providing a clear field of view with the mechanical equipment needed for picking being out of the way is often difficult.

Scanning and measuring with a remotely located laser measuring device(s) eliminates the need for lighting, end effecter lens mounting and real time interaction with the robot arm. It also provides the ability to adjust the placement of the layer as well as the picking via the use of a second layer measuring device if required.

SUMMARY OF THE INVENTION

In accordance with the various embodiments of the present invention, a new type of object detection device is disclosed wherein the object detection device examines objects that have been placed upon a surface to assist in providing data that can indicate whether the objects have properly and accurately been placed upon the surface and that can be used to assist in the robotic palletizing and depalletizing of objects onto a pallet.

One example of the various embodiments of the present invention is the use of laser imaging that allows an object detection device to determine whether an object or set of objects have been is properly placed on a surface. This embodiment allows a depalletizer to properly and consistently pick layers from an unknown source, and then consistently place them onto another destination, without colliding with any part of the layer being picked, or the load being placed upon. The result is a "built" load that is square and plumb, even if the original donor load was not. The fact that the layer sensor(s) act independently of the depalletizer allows this to occur faster and more reliably than if a prior art machine vision system was employed.

DESCRIPTION OF THE DRAWINGS

In the accompanying drawings which form part of the specification.

Corresponding reference numerals indicate corresponding steps or parts throughout the several figures of the drawings.

While one embodiment of the present invention is illustrated in the above referenced drawings and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF A PREFERRED EMBODIMENT OF THE INVENTION

Figure 1:
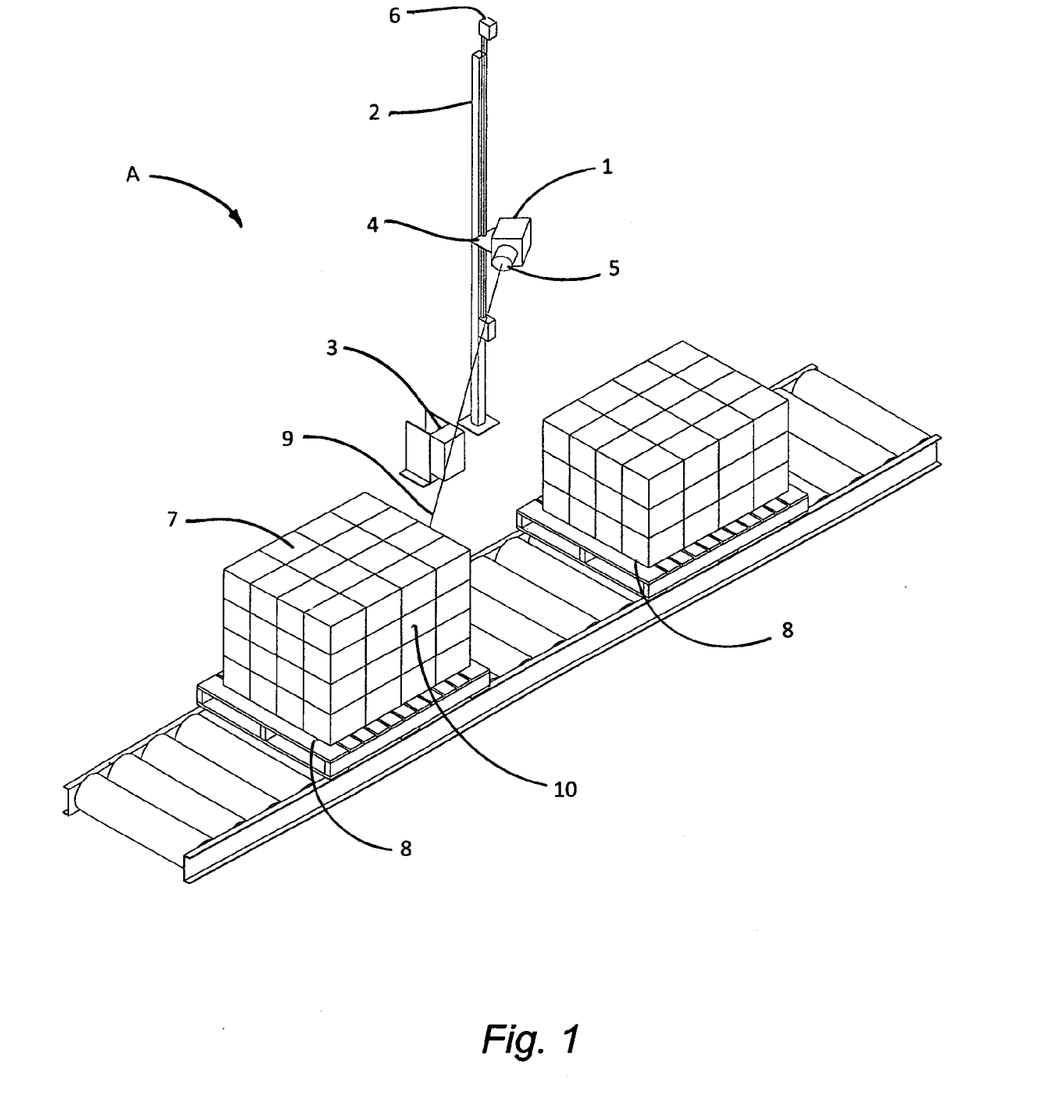
FIG. 1 is a perspective view of one embodiment of the present invention showing that embodiment in operation on a typical conveyor line.
Figures 2, 3:
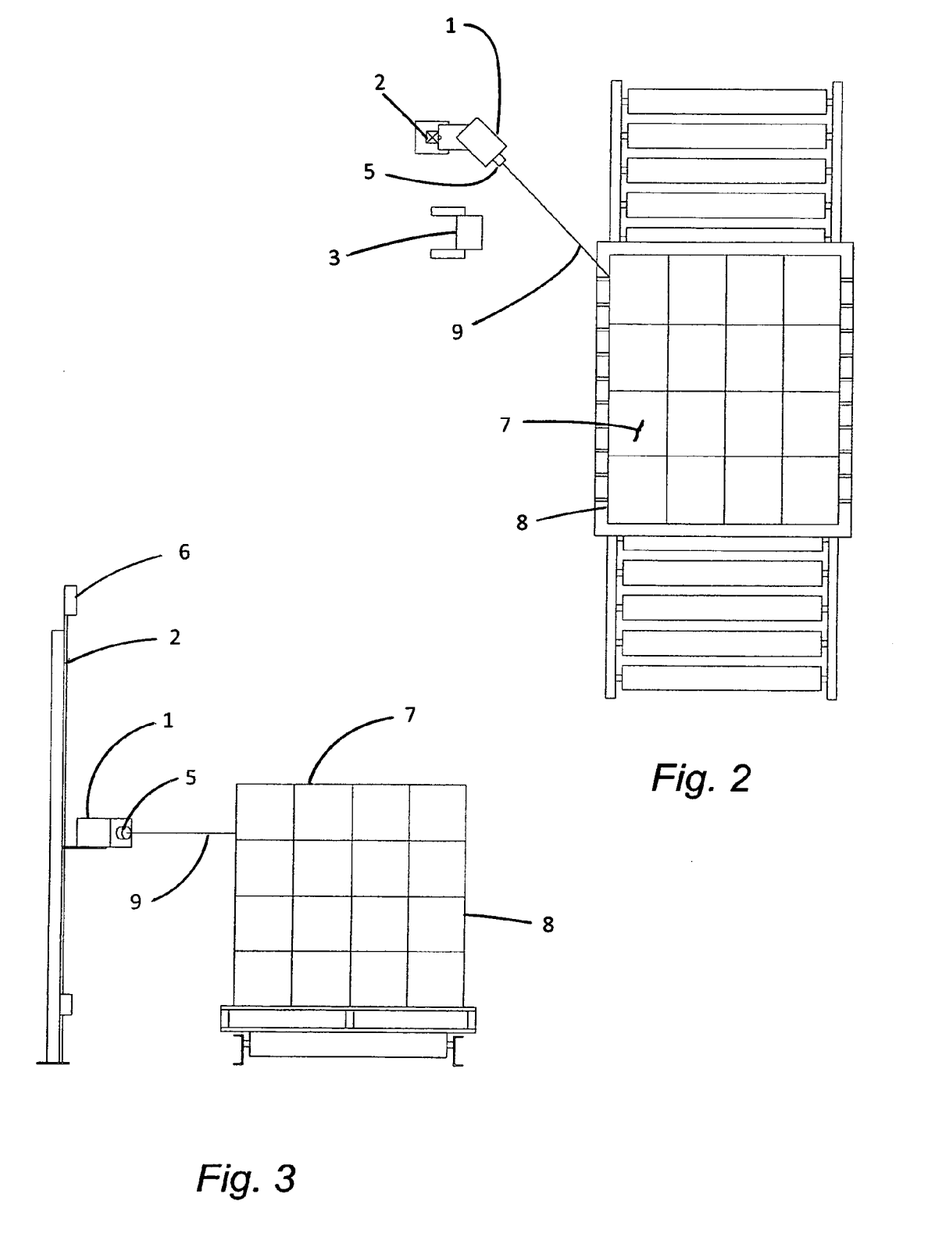
FIG. 2 is a top view of one embodiment of the present invention.
FIG. 3 is a front view of one embodiment of the present invention.
Figure 4:
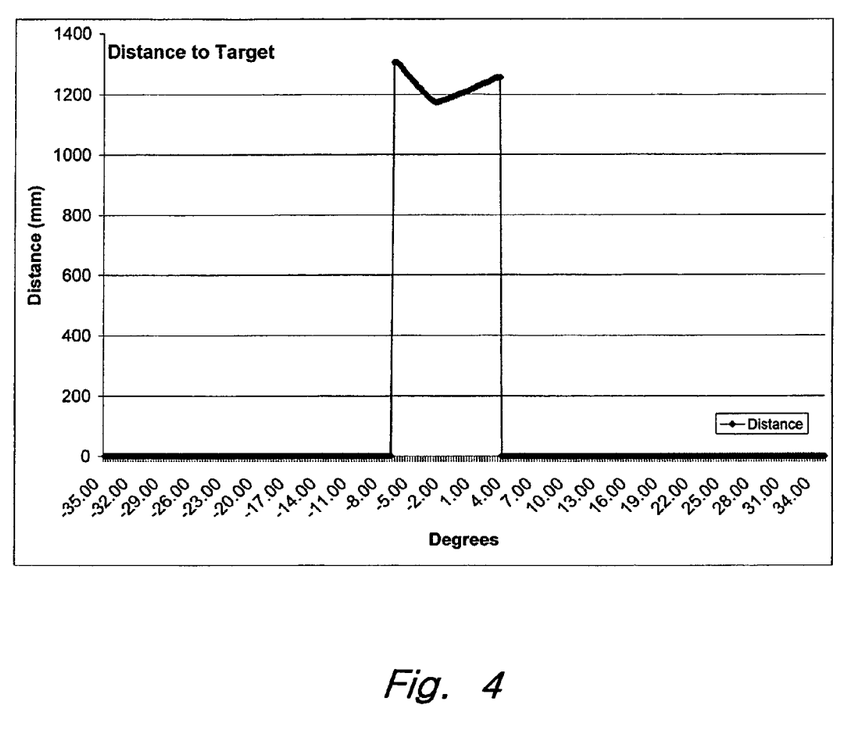
FIG. 4 shows an example of the raw data obtained by the laser measurement scanner and one possible distillation of that raw data into operable data for one embodiment of the present invention.
Figure 5:
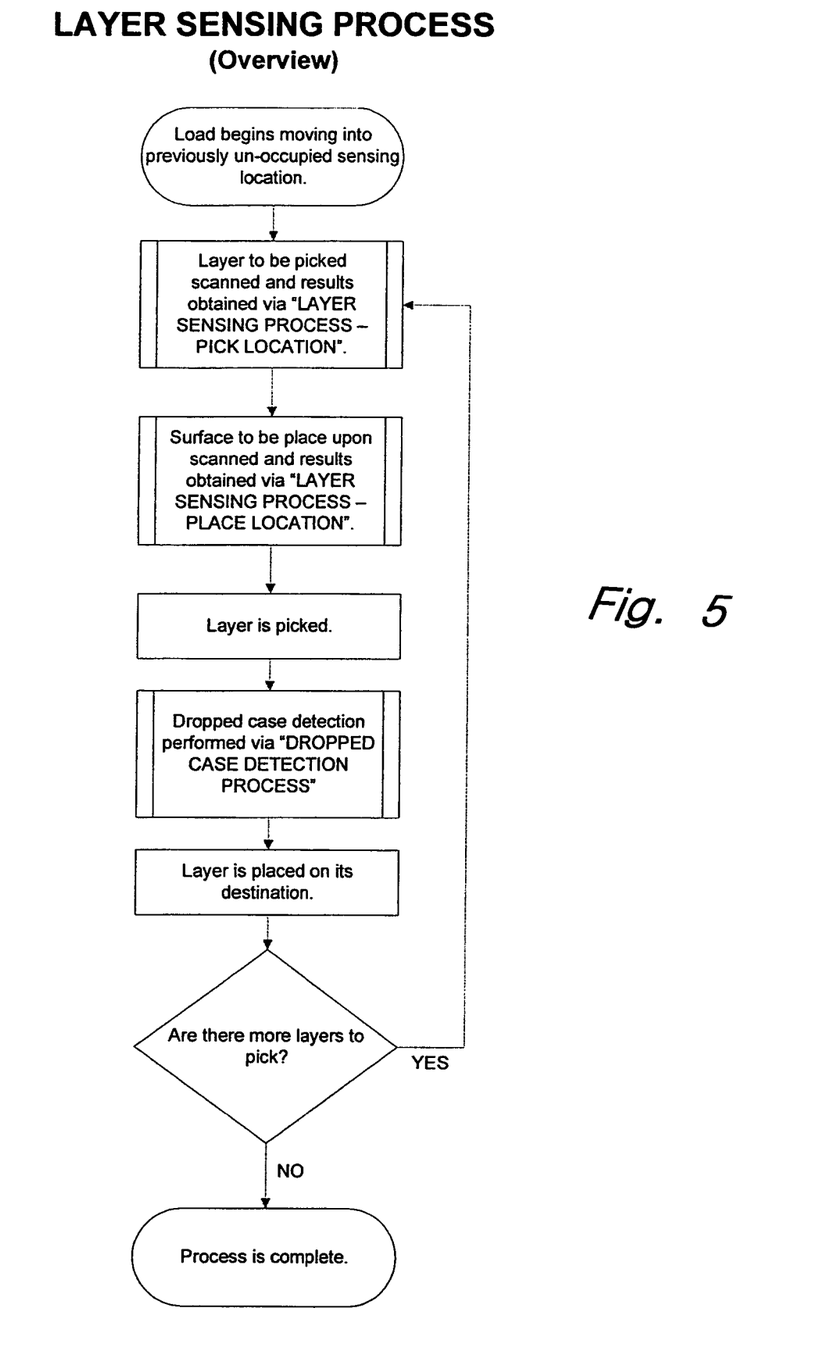
FIG. 5 shows a flow chart that is a general overview of the Layer Sensing Process for one embodiment of the present invention.
Figure 6:
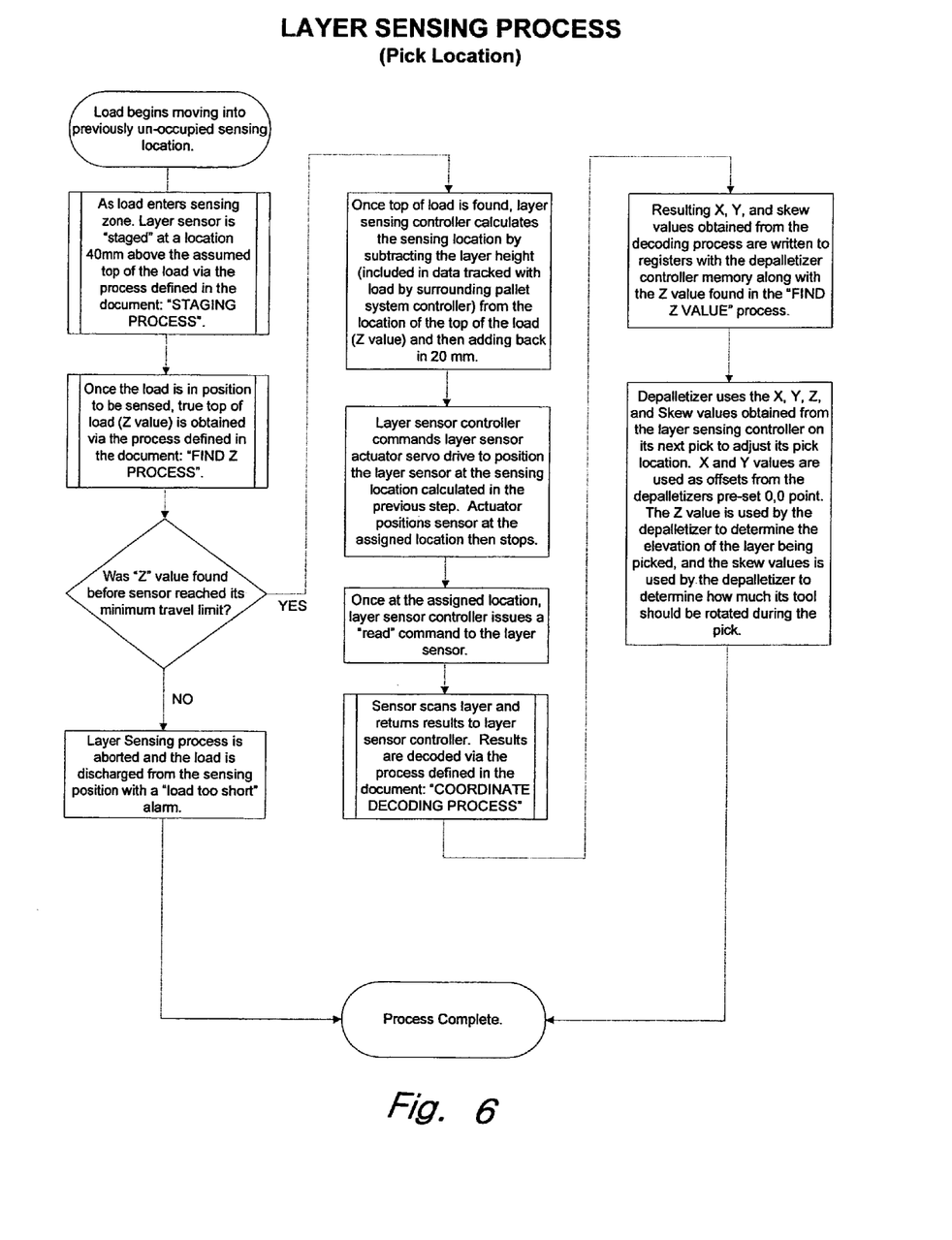
FIG. 6 shows a flow chart of the Pick Location Layer Sensing Process for one embodiment of the present invention.
Figure 7:
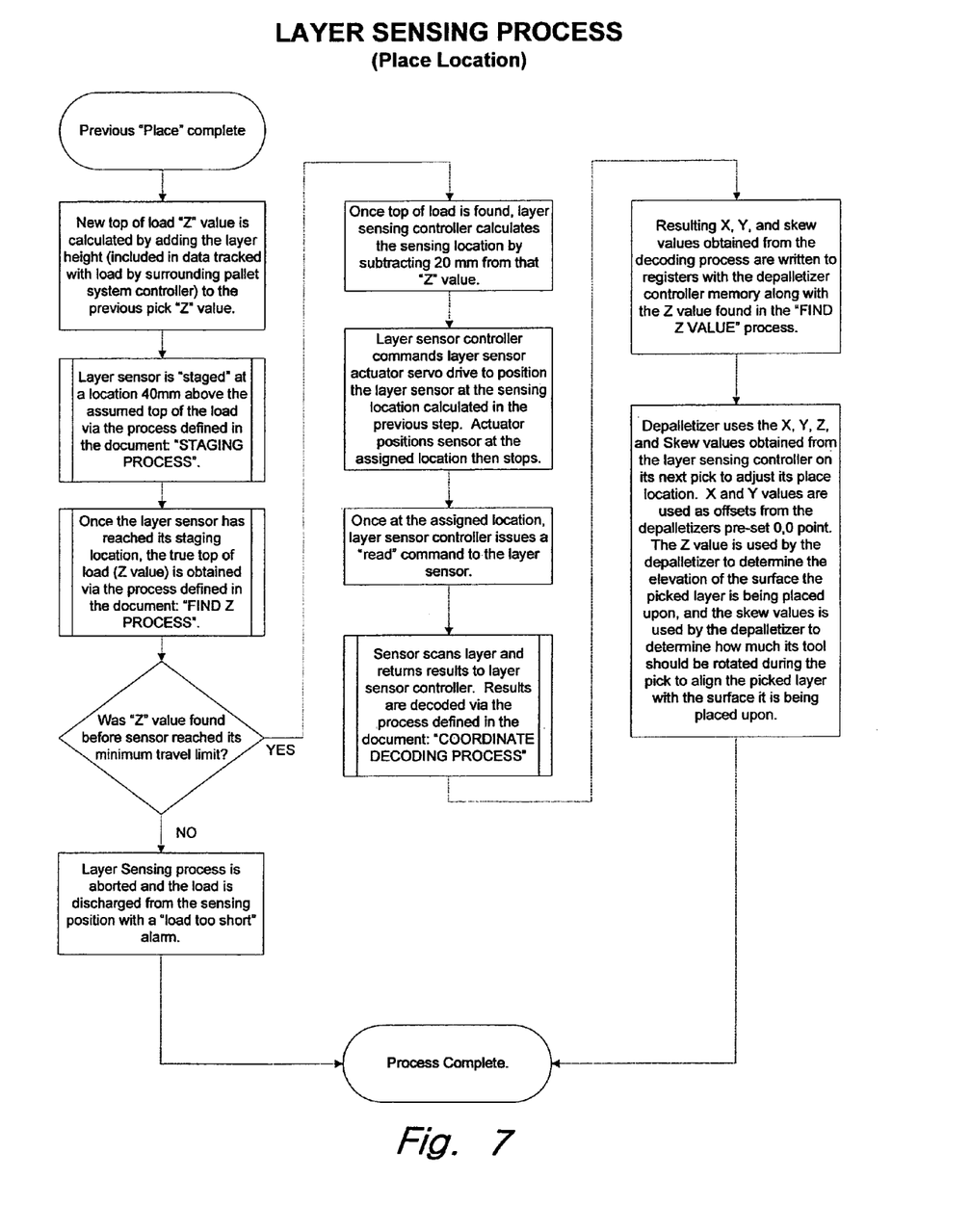
FIG. 7 shows a flow chart of the Place Location Layer Sensing Process for one embodiment of the present invention.
Figure 8:
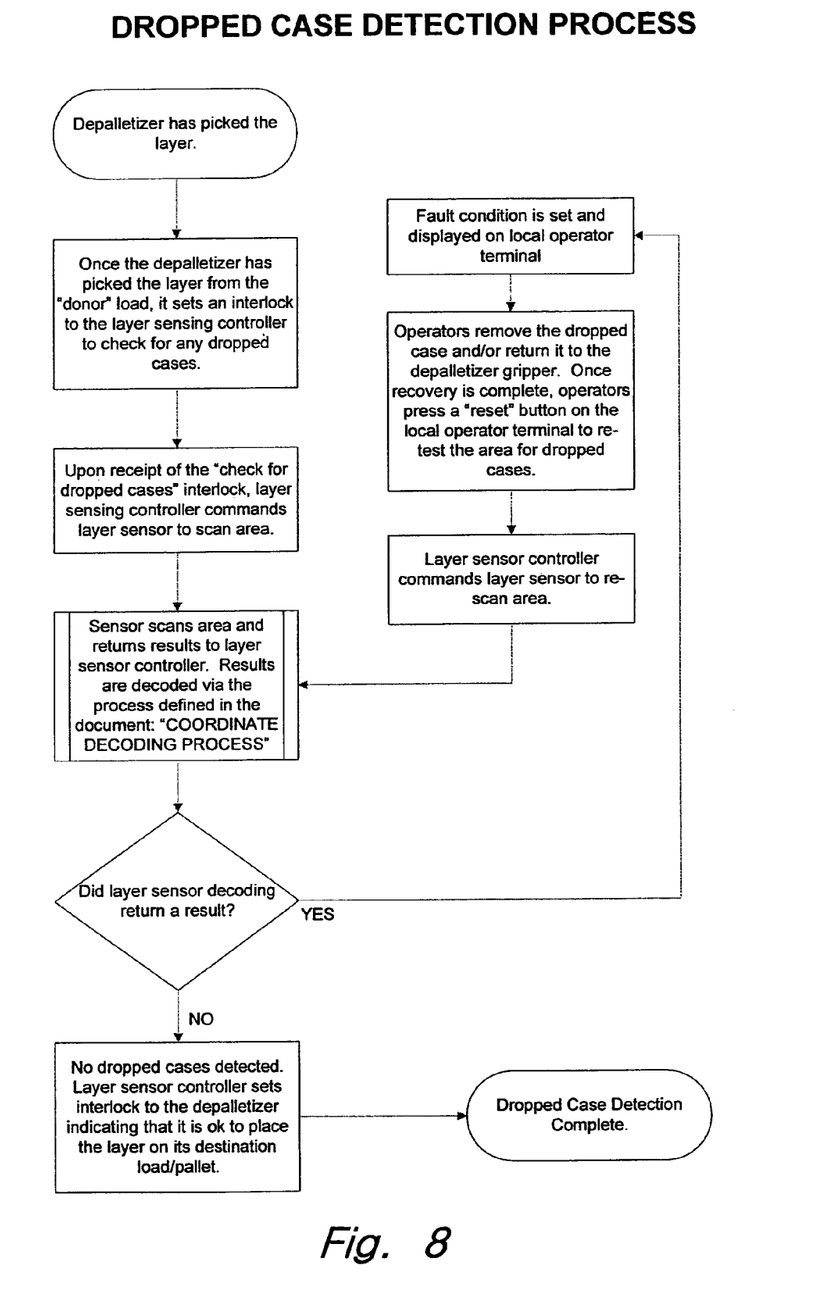
FIG. 8 shows flow chart for the Dropped Case Detection Process for one embodiment of the present invention.
Figure 9:
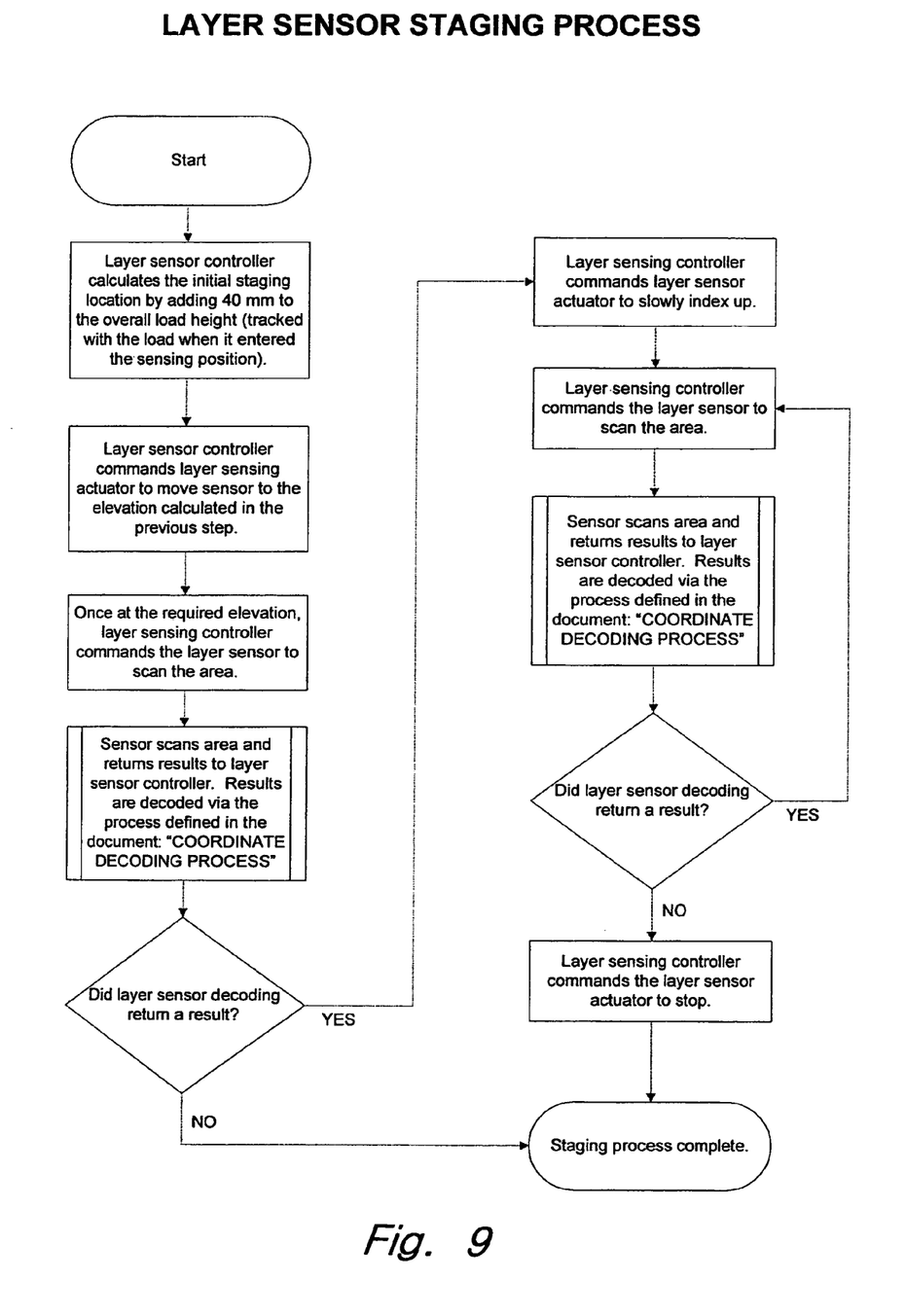
FIG. 9 shows flow chart for the Layer Sensing Staging Process for one embodiment of the present invention.
Figure 10:
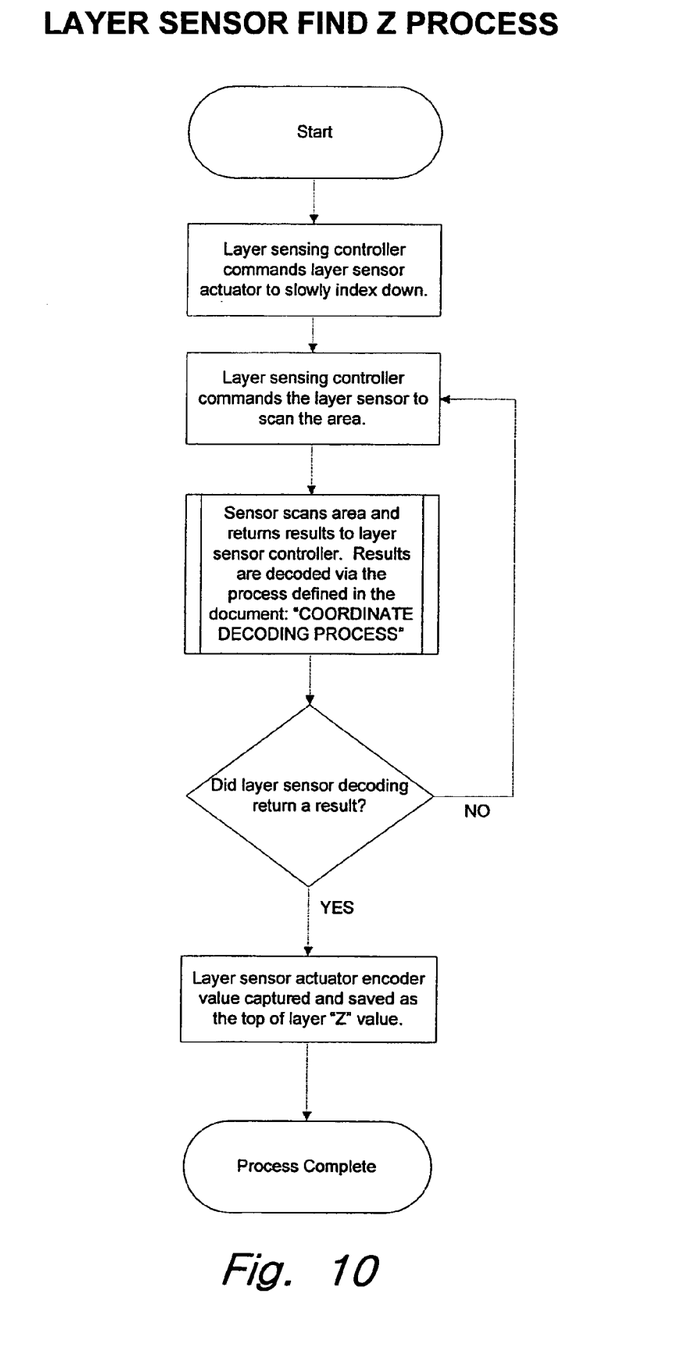
FIG. 10 shows a flow chart for the Layer Sensor Find Z Process for one embodiment of the present invention.
Figure 11:
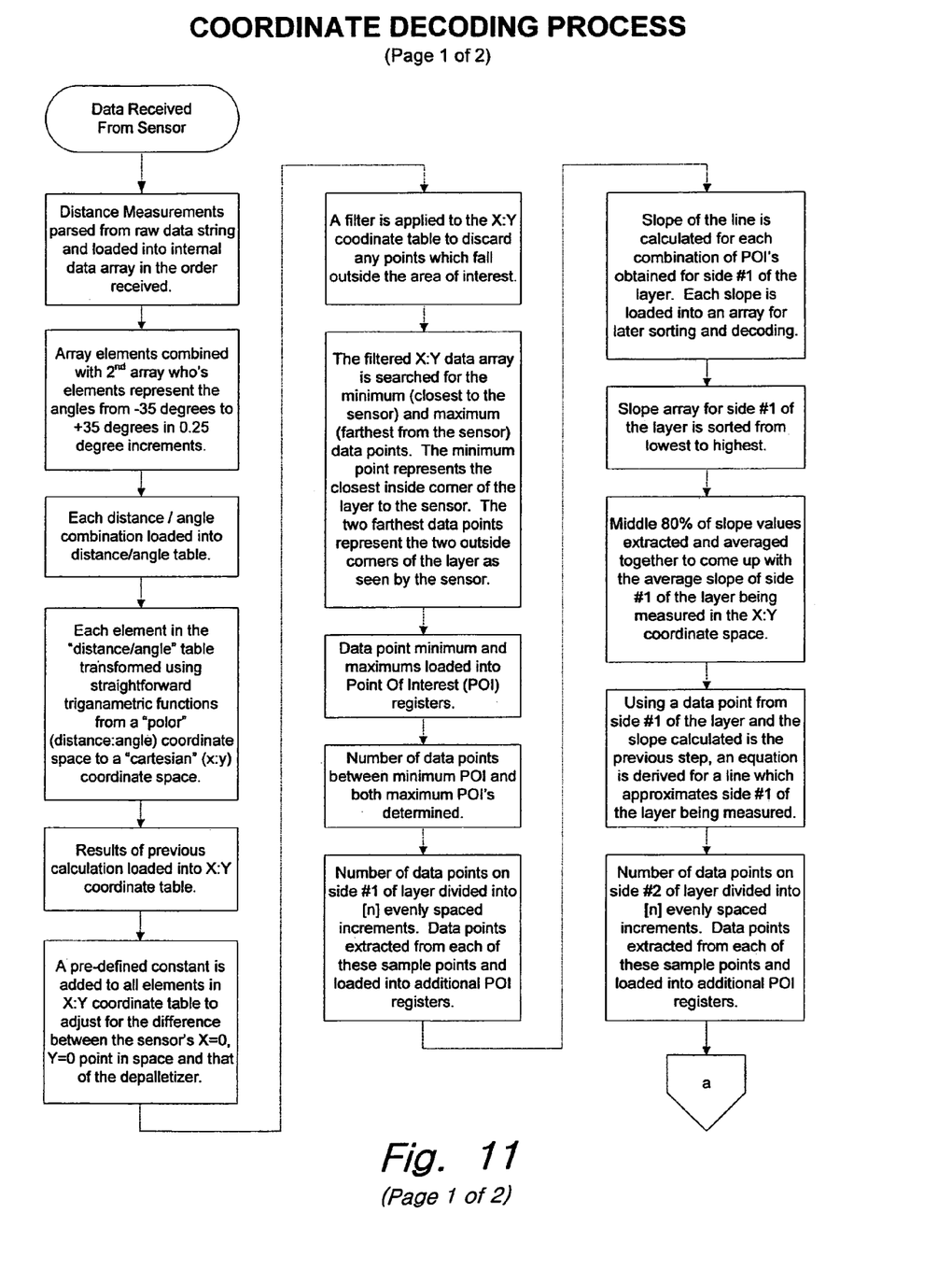
FIG. 11 shows flow chart for the Layer Sensing Coordinate Decoding Process for one embodiment of the present invention.

A preferred embodiment of the object detecting device A of the present invention is illustrated in FIGS. 1 through 11. An example of the physical configuration of a preferred embodiment of the present invention is shown in the drawings of FIGS. 1, 2, and 3. An example of the processes used within the preferred embodiment of the present invention are shown in FIGS. 5, 6, 7, 8, 9 10, and 11.

A preferred embodiment of the object detecting device A (FIG. 1) includes a laser measuring scanner 1, a linear actuator 2, and a layer sensing controller 3). The laser measuring scanner 10 can be a commercially purchased 2D laser measuring scanner capable of emitting a beam of light in an angular sweep of between about 45 degrees and about 90 degrees, taking measurements at between about 0.25 degree and about 2 degree interval increments. At each interval increment, a distance measurement in millimeters can be obtained and transmitted to the layer sensing controller 3. The linear actuator 2 can be vertically mounted and is repositioned by use of an actuator mechanism 6 that can be, for example, a belt or screw type actuator. The linear actuator 2 can also include a servo motor driven to within ±1 mm accuracy.

In a preferred embodiment, the linear actuator 2 has mounting points which accommodate a mounting bracket 4 and a sensor element 5 of the laser measuring scanner 1, thus allowing the sensor 5 to be raised and lowered as necessary throughout the operation of the object detecting device A.

The layer sensing controller 3 can be either a PLC or PC that interfaces with the laser measuring scanner 1 via an RS232/RS422/Ethernet connection. This layer sensing controller 3 receives and decodes the raw data from the laser measure scanner 1 and uses that data to determine the key coordinate points necessary for picking and/or placement of objects. These coordinate points are processed and communicated to the depalletizer (not shown).

In this embodiment, the object detecting device A includes a laser measuring scanner 1 that is mounted on a vertically positioned linear actuator 2. In general terms, the object detecting device A generally operates the linear actuator 2 is driven by a servo drive 6 and will lower the laser measuring scanner 1 from a predetermined position until the laser measuring scanner 1 detects a top layer 7 of a load 8. The laser measuring scanner 1 continues traveling downward for a predetermined distance and comes to a stop on the linear actuator 2. The laser measuring scanner 1 then sends out a laser beam 9 in an arc along a horizontal plane in the general vicinity of the top layer 7 of the load 8. This laser beam 9 detects the distance to an object at predetermined intervals within the arc sweep. In this preferred embodiment of the present invention, the object to be detected is a top layer 7.

This detection method determines the location of three corners of the top layer 7. The length, width, and center of the top layer 7 can then be determined from the corner locations. The length, width, and center, and top of the top layer 7 elevation are then transmitted to the depalletizer (not shown) to use to pick the top layer 7.

In an alternative embodiment, a second, similar laser measuring scanner 1 can be used in similar manner at the location where the top layer 7 is to be relocated by the depalletizer. The operation of the second laser measuring scanner 1 can be used to assist in the proper placement of the top layer 7 at a new location. The length, width, center, and top of the top layer 7 at the new location are generally obtained via the same method described above. These coordinates are can be provided to the depalletizer to allow the depalletizer to properly place the removed top layer 7 from its original location on the top of the load 8 to the new location.

In this embodiment, the depalletizer signals the layer sensing controller 3 that the top layer 7 has been removed from the load 8. The laser measuring scanner 1 then sends out the laser beam 9 in an arc to verify that no objects remain on the load 8 and that the top layer 7 has been completely removed from the load 8. If any object is still detected on the load 8 where the top layer 7 was residing, an error message is sent to the operator of the object detecting device A. The operator then manually intervenes to correct the situation. If the laser measuring scanner 1 verifies that the entire top layer 7 has been removed completely from the load 8, the depalletizer can then be allowed to complete its cycle. After the depalletizer completes its cycle, the laser measuring scanner 1 is then lowered by the linear actuator 2 until the laser measuring scanner 1 senses the next top layer 7 that is at the next level on the top of the load 8. The object detecting device A then determines the location of the next top layer 7 generally as described above after which the depalletizing process is repeated, also as generally described above.

If the top layer 7 of a load 8 is a partial layer, the object detecting device A will detect and generally identify data points that substantially correspond to locations outside a set of allowable limits then generally define the data points that correspond to the expected location of the top layer 7. If this condition is found to exist, the elevation of the partial top layer 7 is noted and the laser measuring scanner 1 is lowered to allow it to sense the second layer 10 in order to calculate the center of second layer.

Operation

The operation of a preferred embodiment of the object detecting device A is described more specifically below.

Picking Process Layer Sensing

The action of identifying, locating, and removing the top layer 7 from the load 8 is generally identified herein as the "picking process" and the removal of the top layer 7 is generally identified herein as the "picking" of the top layer.

In the picking process, the laser measuring scanner 1 is mounted such that it is capable of viewing the load 8 at an angle of about 45 degrees to a pallet of generally rectangular shaped objects. More specifically, in this embodiment the laser measuring scanner 1 is positioned to view the corner of the rectangular objects. It is understood that while the present embodiment positions the laser measuring scanner 1 at about a 45 degree angle to the objects, in other embodiments the laser measuring scanner can be located at any other angle to the objects as long as the angle has been communicated to the laser controller 3 to allow the laser controller to use the actual angle in the laser controller's determination of the spatial coordinates of the objects.

When a new load 8 begins entering the picking location, the object detecting device A positions the laser measuring scanner 1 at a staging location just above the top layer 7 of the load 8. This action occurs at about the time the new load enters into the sensing location area.

After the new load 8 is in position to be sensed by the object detecting device A, the laser measuring scanner 1 is activated and the linear actuator 2 begins moving the laser measuring scanner 1 downward until it detects the top layer 7 of the load 8. The linear actuator 2 then continues moving the laser measuring scanner 1 downward a certain distance before stopping. The laser beam 9 of the laser measuring scanner 1 is then activated and the top layer 7 of the load 8 is scanned. The results of the scan are communicated from the laser measuring scanner 1 to the layer sensing controller 3. The layer sensing controller 3 uses this data to determine the location of the three corners of the top layer 7 (FIG. 1) that has been scanned by the laser beam 9 of the laser measuring scanner 1.

When the raw scanning data for the corners of the top layer 7 to be picked are collected, the layer sensor controller 3 uses the raw scanning data to determine the length, width, and orientation of the top layer 7. From these results, the layer sensing controller calculates 3 can determine a center point of the top of the top layer 7 to be picked within an XYZ coordinate space. This "true" center point is compared against the "ideal" center point that can be defined during an original calibration process wherein the object detecting device A is spatially oriented in relation to the depalletizer. The difference between the "true" center point X, Y, and Z values of the scanned top layer 7 and the "ideal" center point of the top layer 6 is then determined, and that information can be used to calculate the amount of adjustment needed to the actions of the depalletizer to allow the depalletizer to properly center the depalletizer tool on the top layer 7 to be picked from the load 8.

When these calculations are substantially complete, a check is performed against all data points obtained during the process of scanning the top layer 7. This check is made to verify that data points do not fall outside the physical limits of the general operation of the depalletizer. This check is also made to ensure that the depalletizer does not collide with any part of the top layer 7 during the picking process. If this check shows errors that indicate a potential for a collision between the depalletizer and the top layer 7, a fault condition can be communicated to the operator to allow the operator to intervene to remedy the error. If the check determines there are no such collision errors, the layer sensing controller 3 communicates the necessary spatial adjustments, as well as the angle of rotation of the top layer 7 as determined by the layer sensing controller 3, to the depalletizer. This is done so that the depalletizer can adjust itself accordingly during the picking process. The desired result is a picked layer which is perfectly centered and plumb within the depalletizer tool.

Dropped Pick Detection

After a top layer 7 is picked from the load 8, the object detection device A checks the load 8 in a manner similar to that described above to verify that no objects from the top layer 7 were left behind on the load 8. If no objects from the top layer 7 remain on the load 8, the depalletizer is permitted to place the top layer 7 at its new location. However, if an object from the top layer 7 remains on the load 8 after the depalletizer has attempted to remove the top layer 7 from the load 8, a fault condition is communicated to the operator who can intervene to correct the situation.

Place Process Layer Staging

In a preferred embodiment, a second laser measuring scanner (1A) (not shown) can be located near a second location where the depalletizer has been instructed to place the top layer 7 from the load 8. As noted above for the first laser measuring scanner 1, the second laser measuring scanner 1A is mounted such that it views the new load 8A being constructed by the depalletizer at the second location as the top layer 7 from the first location is moved and placed at the second location by the depalletizer. The second laser measuring scanner 1A is mounted such that it views the new load 8A at an angle of about 45 degree, or at another predetermined angle.

While this embodiment include the use and placement of a second laser measuring scanner 1A, it will be appreciated by those skilled in the art that in alternative embodiments, the first laser measuring scanner 1 can also be used to detect the position of the new load 8A. In that configuration, the laser measuring scanner 1 may be rotated on a horizontal plane such that the laser measuring scanner 1 is rotated to point away from the load 8 and toward the second load 8A.

In yet other embodiments, several laser measuring scanners 1 may be used. In such embodiments, the laser controller 3 would accept the signals from the first laser measuring scanner 1, the second laser measuring scanner 1A, and any number of laser measuring scanners 1. The laser controller 3 in that embodiment could then process those signals to detect substantially all locations and characteristics of the top layers 7 as those top layers are positioned and repositioned at various locations.

In these other embodiments, it understood that after each top layer 7 is placed at any location, the laser measuring scanner 1 for that location can be repositioned at an elevation just above the placed top layer. Once staged above the placed top layer 7, the laser measuring scanner 1 can be activated and the linear actuator 2 begins indexing the laser measuring scanner 1 downward until it detects the top layer 7 of the load 8. The linear actuator 2 then continues moving the laser measuring scanner 1 downward a certain distance before stopping. This puts the laser measuring scanner 1 in the proper location to scan the last placed top layer 7 so that the next top layer 7 to be placed at the new location can be properly centered above the previously placed top layer 7.

Then, as generally disclosed in the other embodiments described above, when the laser measuring scanner 1 is stopped, the sensor element 5 of the laser measuring scanner 1 is activated and the load 8 is scanned by the laser beam 9. The data from the scan are communicated from the sensor element 5 to the layer sensing controller 3 when the scan is complete. The layer sensing controller 3 uses this data to determine the location of the three corners of the top layer 7 visible to the sensor element 5.

When the locations of the corners of the top layer 7 on the "place" location are determined, the layer sensing controller 3 determines the length, width, and rotation of the surface of a previously "placed" top layer 7 upon which the next "picked" top layer 7 will be placed. From this determination, the layer sensing controller 3 determines a center point of the top layer 7 of the load 8 to be placed upon within an XYZ coordinate space. This center point is compared against the center point of the top layer 7 of the depalletizer as the top layer was picked. The differences between the "place" location center point X, Y, and Z values with those similar values in the depalletizer are provided to the depalletizer so that the picked top layer 7 can be properly centered on the "place" location load.

It is understood that this comparison of the "place" coordinates is made against the "actual" location of the top layer 7 center point within the depalletizer as it was picked—not the "ideal" location. This is because mechanical limits may not always permit the top layer 7 to be properly centered inside the depalletizer during the "pick" process. By comparing the "place" location center point to the "actual" resulting location within the palletizer and not the "ideal" location, the layer sensor controller 3 can determine the proper adjustments necessary to center the picked top layer 7 at the "place" location. For example, if a top layer 7 being picked needs a +50 mm X adjustment, but mechanical limits prohibit exceeding +40 mm X at the pick position, the top layer would be picked with +40 mm X, resulting in a top layer 7 that is not exactly centered within the picking tool of the depalletizer. Comparing the place location with this actual location of the top layer 7 within the depalletizer tool eliminates the potential 10 mm of error that would have resulted from comparing against an assumed centered top layer 7.

It is understood that there are a number of processes that should generally be executed within the various embodiments of the object detecting device A disclosed herein. FIG. 7 through FIG. 11 illustrate the processes that may be used in a preferred embodiment of the present invention.

In another alternative embodiment (not shown), another type of laser measuring scanner can be positioned near the object to be detected such that the location coordinates of the object to be detected can be used to graph the object in substantially a three dimensional manner. For example, in this alternative embodiment, an alternative laser measuring scanner is used that is not only capable of sweeping its laser beam in a sweep of between about 45 degrees and about 90 degrees to identify the two dimensional coordinates of the object to be detected, the alternative laser measuring scanner is also capable of controlling the laser beam in a raster-like fashion so at to detect a third dimensional set of coordinates for the object to be detected. Thus, it is appreciated by those of skill in the art that the sweeping action of the laser beam of the alternative laser measuring device, when coupled with the raster-like action of the laser beam, can provide a set of three dimensional coordinates related to the object to be detected which can then be used to generate a three dimensional graph of the object to be detected. Then, this three dimensional graph can be analyzed by the laser sensor controller 3 to determine if the object to be detected meets a predetermined set of values that show the object to be detected is satisfactorily loaded. It is understood that in this alternative embodiment, the alternative laser measuring device is preferably fixedly positioned above the level of the object to be detected or in any other general location as long as the laser beam from the alternative laser measuring scanner can substantially scan at least three surfaces of the object to be detected. In yet other embodiments, the laser measuring scanner can be adjustably located above the object to be detected. It is also understood that those skilled in the art can adapt the processes shown in FIGS. 5-11 to generate three dimensional coordinates rather that the set of two dimensional coordinates of a preferred embodiment described above. In certain versions of the present alternative embodiment, there is no need for the linear actuator 2.

While the above description describes various embodiments of the present invention, it will be clear that the present invention may be otherwise easily adapted to fit any configuration where an object detecting device is required. Additionally, as various changes could be made in the above constructions without departing from the scope of the invention, it is also intended that all matter contained in the above description or shown in the accompanying drawings shall be interpreted as illustrative and not in a limiting sense. The scope of the invention should be determined by the appended claims and their legal equivalents, rather than by the examples given.

What is claimed is:

1. An object detection device comprising:
   a repositionable laser measuring scanner capable of emitting and detecting a laser beam and wherein the laser measuring scanner is capable of communicating at least one signal containing data associated with the laser beam; and
   a layer sensing controller capable of accepting the at least one signal communicated from the laser measuring scanner wherein the layer sensing controller uses the at least one signal to determine a set of coordinates of an object being detected that is within a range and scope of the laser beam,
      wherein the object being detected is a load that includes a pallet of generally rectangular-shaped objects,
      wherein the set of coordinate points is related to the location of a top layer of the load and
      wherein the set of coordinate points is compared to an ideal center point of the top layer and that comparison is used to determine the amount of any adjustments needed to allow a depalletizer to properly center a depalletizer tool of the depalletizer in relation to the top layer to be picked from the load.

2. The object detecting device of claim 1 wherein the laser measuring scanner is capable of emitting a laser beam within an angular sweep and is also capable of taking a plurality of linear distance measurements within the angular sweep.

3. The object detecting device of claim 2 wherein the angular sweep includes an angle of between about 45 degrees and about 90 degrees, wherein measurements are taken within the angular sweep at intervals of between about 0.25 degrees and about 2 degrees within the angular sweep.

4. The object detecting device of claim 3 wherein the layer sensing controller is one of either a programmable logic controller or a personal computer that interfaces with the laser measuring scanner.

5. The object detecting device of claim 4 wherein one of either the programmable logic controller or the personal computer interfaces with the laser measuring scanner via an RS232/RS422/Ethernet connection.

6. The object detecting device of claim 5 wherein the laser measuring scanner is mounted such that it is capable of viewing the load at a known angle in relation to at least one straight edge of the generally rectangular-shaped objects.

7. The object detecting device of claim 6 wherein the known angle is about 45 degrees.

8. The object detecting device of claim 7 wherein the layer sensing controller receives and decodes at least one set of data from the laser measuring scanner and uses that set of data to determine a set of coordinate points related to the load.

9. The object detecting device of claim 8 wherein the set of coordinate points are communicated to the depalletizer.

10. The object detecting device of claim 1 wherein the set of coordinate points is reviewed to verify that the set of coordinate points does not fall outside the physical operational limits of the depalletizer.

11. The object detecting device of claim 10 further comprising a review of the set of coordinate points to verify that the depalletizer does not collide with any part of the top layer during a picking action of the depalletizer.

12. The object detecting device of claim 11 further comprising the communication of a fault condition to an operator of the depalletizer if the review of the set of coordinate points suggests a potential for a collision between a portion of the depalletizer and the top layer.

13. The object detecting device of claim 12 wherein the layer sensing controller communicates to the palletizer a set of spatial adjustments and an angle of rotation of the top layer to the depalletizer.

14. The object detecting device of claim 13 wherein after the laser measuring scanner detects the top layer of the load, the laser measuring scanner continues traveling downward on a first linear actuator for a predetermined distance and then stops.

15. The object detecting device of claim 14 wherein after traveling downward for the predetermined distance, the laser measuring scanner causes a laser beam to be emitted in a generally arc-shaped scan along a horizontal plane to detect a set of distances between the laser measuring scanner and the object to be detected.

16. The object detecting device of claim 15 further comprising a detection method that determines the location of at least three corners of the top layer.

17. The object detecting device of claim 16 wherein the detection method determines a length, a width, and a center of the top layer.

18. The object detecting device of claim 17 wherein the length, the width, and the center, and a top of the top layer elevation are transmitted to the depalletizer.

19. The object detecting device of claim 18 further comprising a second laser measuring scanner and a second linear actuator driven by a second actuator mechanism to lower the second laser measuring scanner from a set first position until the second laser measuring scanner detects a second top layer of a second load that has been placed at a second location, wherein after the second laser measuring scanner detects the second top layer of the second load, the second laser measuring scanner continues traveling downward for a predetermined distance, wherein after traveling downward for the predetermined distance, the second laser measuring scanner causes a second laser beam to be emitted in a generally arc-shaped scan along a horizontal plane to detect a set of distances between the second laser measuring scanner and an object to be detected at the second location, wherein a detection method determines the location of at least three corners of the second top layer to thereby locate a second length, a second width, and a second center of the second top layer of the object to be detected at the second location, and wherein the second length, the second width, and the second center, and a second top elevation of the top layer of the second top layer at the second location are transmitted to the depalletizer.

20. The object detecting device of claim 18 wherein the second laser measuring scanner is also the first laser measuring scanner, and the second linear actuator is also the first linear actuator.

21. The object detecting device of claim 18 wherein the depalletizer removes the top layer from the load at the first location after which the first laser measuring scanner causes the laser beam to be emitted in a generally arc-shaped scan to verify that no object remains on the load and that the top layer has been completely removed from the load.

22. The object detecting device of claim 21 wherein an error message is sent to an operator of the object detecting device if the top layer has not been completely removed from the load after the depalletizer has attempted to remove the top layer from the load.

23. The object detecting device of claim 22 wherein after the depalletizer has attempted to remove the top layer from the load and the object detecting device has verified that no object from the top layer remains on the load, the laser measuring scanner is then lowered by the linear actuator until the laser measuring scanner senses a next top layer that is at a next level on the top of the load.

24. The object detecting device of claim 23 wherein if the top layer of the load is a partial top layer, the object detecting device will detect and generally identify any location data points related to the partial top layer that generally correspond to any locations of the partial top layer that are outside a set of allowable limits that generally define a predetermined set of location data points corresponding to an expected location of the top layer.

25. The object detecting device of claim 24 wherein if any location data points of the partial top layer that are outside the set of allowable limits that generally define the preset set of location data points corresponding to the expected location of the top layer, an elevation of the partial top layer is noted and the laser measuring scanner is lowered to allow it to sense the next top layer in order to determine the center of second top layer.

26. The object detecting device of claim 25 wherein after the top layer is picked from the load, the object detection device verifies that no objects from the top layer were left behind on the load and that if no objects from the top layer were left behind on the load, the depalletizer is permitted to place the top layer at a second location.

27. The object detecting device of claim 26 wherein a fault condition is communicated to the operator if an object from the top layer was left behind on the load after the depalletizer has attempted to remove the top layer from the load.

28. The object detecting device of claim 27 wherein the linear actuator is vertically mounted and wherein the linear actuator is repositioned by an actuator mechanism that comprises at least one of either a belt actuator or a screw type actuator.

29. The object detecting device of claim 28 wherein the linear actuator includes a servo motor driven to within +/−1 mm linear accuracy.

30. The object detecting device of claim 29 wherein the linear actuator has mounting points which accommodate a mounting bracket and a sensor for the laser measuring scanner that allow the sensor to be raised and lowered in relation to the object being detected.

31. The object detecting device of claim 30 wherein the linear actuator is driven by the actuator mechanism to lower the laser measuring scanner until the laser measuring scanner detects the object to be detected.

32. An object detection device comprising:
a repositionable laser measuring scanner capable of emitting and detecting a laser beam having an angular sweep, is capable of communicating at least one signal containing data associated with the laser beam, and is capable of taking a plurality of linear distance measurements within the angular sweep; and
a layer sensing controller capable of accepting the at least one signal communicated from the laser measuring scanner
wherein the layer sensing controller uses the at least one signal to determine a set of coordinate points of an object being detected within a range and scope of the laser beam,
wherein the object being detected is a load that includes a set of stacked objects,
wherein the repositionable laser measuring scanner is mounted such that it is capable of viewing the load at an angle of about 45 degrees in relation to at least one straight edge of the set of stacked objects,
wherein the set of coordinate points are communicated to a depalletizer, and
wherein the set of coordinate points is related to at least a top layer of the load.

* * * * *